April 1, 1958 B. KOPELMAN 2,829,321

ARSENIC TELLURIUM ALLOYS

Filed July 30, 1953

INVENTOR
BERNARD KOPELMAN
BY
ATTORNEY

United States Patent Office 2,829,321 Patented Apr. 1, 1958

2,829,321

ARSENIC TELLURIUM ALLOYS

Bernard Kopelman, Bayside, N. Y., assignor to Sylvania Electric Products Inc., a corporation of Massachusetts Application July 30, 1953, Serial No. 371,215

12 Claims. (Cl. 317—237)

This invention deals with crystal rectifiers of the point contact or area contact type. More particularly, it relates to a group of novel compositions consisting primarily of the arsenic tellurium alloys which are effective as crystal rectifiers.

A crystal rectifier is a non-linear device which has the property of transforming alternating current into direct current and is capable of handling fairly broad frequencies of alternation of the source current. Such crystal rectifiers depend for their action for the most part on the presence of regional areas generally at the surface which transmit current more readily in one direction than in another. Such regions or areas have been designated as barrier layers. These barrier layers are thin and their effectiveness may be designated by the fact that normally the resistance in a non-conducting direction may be several thousand times higher than the resistance in a conducting direction.

Two fairly standard means have been developed for using such rectifier. The first involves application of an extremely fine point. A major function of the use of such point contact is miniaturization and reduction of electrostatic capacity. Under these conditions the crystal rectifier is suitable for high frequency purposes and is used as a detector in the micro-wave region as a substitute for a vacuum tube. As a matter of fact point contact crystal rectifiers were very common devices in the early history of radio communication and detectors. They fell into obscurity with the development of the vacuum tube and again became quite important in later years with the expansion of communications to high frequency and micro-wave regions. The area type rectifier is most useful for power conversion purposes in which the transfer of massive amounts of A. C. power into comparable D. C. power is desired. When made in large banks such fixed rectifiers are efficient substitutes for motor generator sets.

In the early days the most common crystal rectifier was galena and, as indicated, an important component in such early radio receivers was a piece of galena and its attendant cat whisker. More recently, germanium and silicon have emerged as important crystal rectifier materials for a point contact construction. Materials most useful for power conversion purposes are selenium, copper oxide and magnesium sulfide.

Germanium and silicon point contact rectifiers suffer from several disadvantages. Germanium is an expensive material and must be very carefully processed in order to obtain the best results. While the resistance ratios are high and the voltage of operation are correspondingly high the carrying capacity is relatively low. In the case of both selenium and copper oxide the most common type of plate area type rectifying materials the voltage carrying capacity is relatively low or in terms of the electrical engineer the back voltage does not exceed 50 to 60 volts per cell.

The general field of crystal rectifiers is an exceptionally important one in electrical engineering and in communications.

It is an object of this invention to develop a group of crystal rectifier materials which are useful both as point contact and area type rectifiers.

It is another object of this invention to develop materials which are relatively inexpensive.

It is a still further object of this invention to develop crystal rectifiers which under proper operating conditions will stand exceptionally high operating voltages and high operating currents so that when properly used they exhibit advantages over existing fixed rectifying devices.

In accordance with this invention these and other advantages which are incidental to its application can be obtained with the arsenic tellurium alloys particularly those which have been doped with elements of either the #4 group or with the elements of group #7.

In the accompanying drawings which illustrate preferred forms of devices embodying features of this invention:

The arsenic tellurium alloys of this invention are really the inter-metallic compounds which are prepared from these two individual elements. They are mixed and reacted in ratios such as 50 atomic percent arsenic to 50 atomic percent of tellurium or, for example, 66⅔ atomic percent of arsenic to 33⅓ atomic percent of tellurium. In the preparation of these materials they are normally ground to form a fine powder which is then thoroughly mixed together and placed into a crucible which may be made of graphite or any other of the crucible materials which will not react with the arsenic or tellurium. The mixture is then fired in a furnace at a temperature in the neighborhood of 550° C. Preferably the furnace atmosphere is either one of the inert gases such as argon or helium or may even be vacuum. After the materials have been allowed to cool to room temperature at least one surface is polished.

It has been found, for example, that when an arsenic tellurium inter-metallic compound containing 1 mole of arsenic for 1 mole of tellurium has been prepared in this manner the rectification ratio of at least 2 or 3 to 1 can be obtained with this material, with a back voltage of about 20 to 50 volts. The rectifier material in this case will exhibit N type properties.

In those cases, however, wherein the arsenic tellurium inter-metallic compound has been doped with a small amount of a group 4 element such as a tin, for example, it has been found that a material containing this same mole for mole characteristic but containing a small amount of tin in addition thereto such as, for example, in the neighborhood of 0.5% by weight has a rectification ratio greater than 250 to 1 at one volt.

Figure 1:
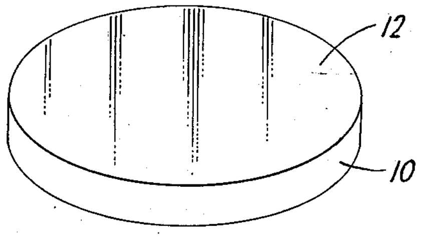
Figure 1 is a perspective view partly in section showing an arsenic tellurium alloy.

In Figure 1 of the drawings 10 represents a crystal of the inter-metallic arsenic tellurium compound. 12 represents one of the polished surfaces of the material.

Figure 2:
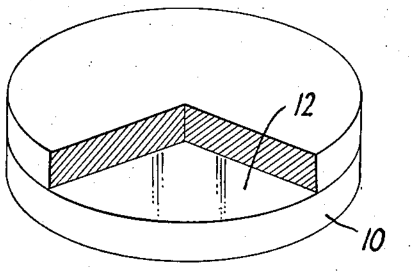
Figure 2 is a perspective view partly in section of an area type rectifier of this invention.

In Figure 2 an electrode which bears on the polished surface is shown in addition thereto. This electrode covers the entire surface area of the material and therefore this rectifier may be referred to as one of the area type.

Figure 3:
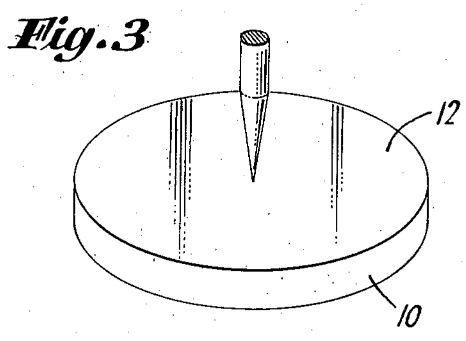
Figure 3 is a perspective view partly in section of a point contact type rectifier of this invention.

In Figure 3 the electrode which bears on the polished surface is pointed and may, therefore, refer to this rectifier as a point type rectifier.

The general method of preparation of these inter-metallic compounds involves in putting them into such form that they will most easily react with one another. This can be accomplished with arsenic and tellurium by putting them in a powder form and mixing them thoroughly. The powder materials can then be placed into a crucible made of graphite quartz, or resistant metals such as stainless steel in which it can be heated in an inert atmosphere. The best temperature for accomplishing this purpose is one which lies within the range of 450–750° C. The preferred temperature, however, is in the neighborhood of 550° C. The reaction time or period of heating is usually about two hours.

While the above description and drawings submitted herewith discloses a preferred and practical embodiment of the crystal rectifiers of this invention it will be understood that the specific details of construction and arrangement of parts as shown and described are by way of illustration and are not to be construed as limiting the scope of the invention.

What is claimed is:

1. A semiconductor device including a semiconductive body having a rectifying connection, said semiconductive body consisting essentially of an arsenic-tellurium inter-metallic compound.

2. A semiconductor device including a semiconductive body having a rectifying connection, said semiconductive body consisting essentially of an arsenic-tellurium inter-metallic compound having approximately one mole of arsenic for each mole of tellurium.

3. A semiconductor device including a semiconductive body having a rectifying connection, said semiconductive body consisting essentially of an arsenic-tellurium inter-metallic compound wherein the mole ratio of arsenic to tellurium is 2 to 1.

4. A semiconductive device including a semiconductive body having a rectifying connection, said semiconductive body consisting essentially of an arsenic-tellurium inter-metallic compound, and a doping constituent in said semiconductive body of an element from the main family of Group IV.

5. A semiconductive device including a semiconductive body having a rectifying connection, said semiconductive body consisting essentially of an arsenic-tellurium inter-metallic compound, and a doping constituent in said semiconductive body of an element from the halogen family of Group VII.

6. A semiconductive device including a semiconductive body having a rectifying connection, said semiconductive body consisting essentially of an arsenic-tellurium inter-metallic compound, and a doping constituent in said semiconductive body of iodine.

7. A semiconductive device including a semiconductive body having a rectifying connection, said semiconductive body consisting essentially of an arsenic-tellurium inter-metallic compound, and approximately .5% by weight of tin in addition to the arsenic and tellurium.

8. A semiconductive device including a semiconductive body having a rectifying connection, said semiconductive body consisting essentially of an inter-metallic compound of powdered arsenic and tellurium partially reduced in an inert atmosphere, and a doping constituent.

9. A current rectifier including a semiconductive body having a rectifying connection, said semiconductive body consisting essentially of an arsenic-tellurium inter-metallic compound, and a doping constituent.

10. A current rectifier including a semiconductive body having a rectifying connection, said semiconductive body consisting essentially of an arsenic-tellurium inter-metallic compound having approximately one mole of arsenic for each mole of tellurium, and a doping constituent.

11. A current rectifier including a semiconductive body having a rectifying connection, said semiconductive body consisting essentially of an arsenic-tellurium inter-metallic compound wherein the mole ratio of arsenic to tellurium is 2 to 1, and a doping constituent.

12. A semiconductive device including a semiconductive body having a rectifying connection, said semiconductive body consisting essentially of an arsenic-tellurium inter-metallic compound, and a small quantity of tin in addition to the arsenic and tellurium.

References Cited in the file of this patent

UNITED STATES PATENTS

| | | |
|---|---|---|
| 879,117 | Pierce | Feb. 11, 1908 |
| 1,751,359 | Ruben | Mar. 18, 1930 |
| 1,751,361 | Ruben | Mar. 18, 1930 |
| 2,032,439 | Ruben | Mar. 3, 1936 |

OTHER REFERENCES

Mellor: "A Comprehensive Treatise on Inorganic and Theoretical Chemistry," vol. 11; pp. 58–59 (1931), pub. by Longman's Green & Co., New York.